United States Patent [19]
Atoji et al.

[11] Patent Number: 5,422,737
[45] Date of Patent: Jun. 6, 1995

[54] DEVICE FOR MOUNTING AN ORIGINAL ONTO AN IMAGE READING DRUM

[75] Inventors: Hitomi Atoji; Seiji Okazaki; Shinji Itoh; Yuji Mizuno, all of Kyoto, Japan

[73] Assignee: Dainippon Screen Manufacturing Co., Kyoto, Japan

[21] Appl. No.: 893,268

[22] Filed: Jun. 4, 1992

[30] Foreign Application Priority Data

Jun. 5, 1991 [JP] Japan ............................. 3-51032 U
Dec. 13, 1991 [JP] Japan ............................ 3-110192 U
Apr. 24, 1992 [JP] Japan ................................ 4-34435

[51] Int. Cl.$^6$ ............................ H04N 1/06; H04N 1/08; G03B 27/62
[52] U.S. Cl. ................................... 358/492; 358/490; 355/75
[58] Field of Search ................ 355/75; 358/490, 491, 358/492, 493, 495

[56] References Cited

U.S. PATENT DOCUMENTS

| 4,440,491 | 4/1984 | Takahama | 358/492 |
| 4,575,398 | 3/1986 | Tschishow | 156/99 |
| 4,933,779 | 6/1990 | Milch | 358/492 |
| 4,963,997 | 10/1990 | Van Scooter | 358/493 |
| 4,975,735 | 12/1990 | Bright et al. | 355/75 |
| 4,996,605 | 2/1991 | Taniguchi et al. | 358/493 |

FOREIGN PATENT DOCUMENTS 0096530 12/1983 European Pat. Off.
0303960 2/1989 European Pat. Off.
2197964 6/1988 United Kingdom.

OTHER PUBLICATIONS

Patent Abstracts of Japan Publication No. JP60208849.
Japanese Abstract of Patent 56-94871.

*Primary Examiner*—Edward L. Coles, Sr.
*Assistant Examiner*—Kimberly A. Williams
*Attorney, Agent, or Firm*—Ostrolenk, Faber, Gerb & Soffen

[57] ABSTRACT

The invention provides a device for efficiently mounting an original onto an image reading drum in an image scanning system. The mounting device includes a lower holder section and an upper holder section, each made of a flexible but hard plastic sheet. The original is held in between the lower holder section and the upper holder section and is attached onto the image reading drum, which has a predetermined thickness greater than a distance causing Newton's rings. Accordingly, image signals obtained by scanning the original effectively represent an original image without Newton's rings.

20 Claims, 17 Drawing Sheets

DEVICE FOR MOUNTING AN ORIGINAL ONTO AN IMAGE READING DRUM

BACKGROUND OF THE INVENTION

1. Field of the Invention

The present invention pertains to a device for mounting an original onto an image reading drum in an image scanning system.

2. Description of the Prior Art

Drum-type image scanning systems generally comprise a transparent image reading drum, on which an original to be scanned is mounted.

The original is manually attached and fixed onto the cylindrical surface of the image reading drum with adhesive tape, and is detached from the drum by peeling the adhesive tape off the original. This manual attachment, however, does not assure complete contact of the original with the image reading drum, and in many cases, its poor contact with or partial separation from the drum causes Newton's rings.

When the original is large in size, an operator can find Newton's rings without any difficulty and adjust the attachment of the original to the image reading drum. On the other hand, it is rather difficult to find Newton's rings on a small-sized original, and the obtained image signals sometimes include signals caused by Newton's rings. In other words, conventional manual attachment does not efficiently prevent occurrence of Newton's rings especially for a small-sized original.

There are some known techniques used for prevention of Newton's rings. One proposed technique is to spray powdery stone (particularly talc) on the lower surface of the original before mounting the original on the image reading drum, and another proposed technique is to use an image reading drum with a window. The former technique requires skill for evenly spraying the powdery stone, as well as considerable time and labor. The latter technique limits the position of the original to the window on the image reading drum, thus wasting the residual space on the drum.

SUMMARY OF THE INVENTION

The general object of the invention is to provide an improved device for mounting an original onto an image reading drum through a simple operation.

A specific object of the invention is to provide a device for attaching an original onto an image reading drum without causing Newton's rings.

The present invention is directed to a device for mounting an original onto an image reading drum in an image scanning system, comprising: a lower holder frame of a flexible sheet having a first opening which is smaller than the original; an upper holder frame of a flexible sheet having a second opening corresponding to the first opening, being fixed to one end of the lower holder frame such that the original is held in between the lower holder frame and the upper holder frame.

According to another aspect of the present invention, a device further comprising a transparent film, one end of which is fixed to the upper holder frame, for covering the first and second openings.

According to still another aspect of the present, another end of the transparent film projects from a free end of the upper holder frame by a length greater than the total thickness of the lower holder frame and the upper holder frame.

According to a preferred embodiment, the lower holder frame and the upper holder frame form a disk-shaped holder; and the device further comprises a supporting sheet with a circular opening, which the disk-shaped holder fits, for rotatably supporting the disk-shaped holder.

According to another preferred embodiment, the disk-shaped holder comprises an original guide frame, disposed between the upper and lower holder frames, having a third opening greater than the original, the third opening spreading over the first opening such that the original is positioned in the third opening between the upper and lower holder frames.

According to still another preferred embodiment, the original guide frame has a circular shape greater than the lower and upper holder frames; and the supporting sheet has a ring support part of a terraced shape on the circumference of the circular opening on which the original guide frame is rotatably disposed.

According to a preferred embodiment, a device further comprising a transparent film, one end of which is fixed to the supporting sheet, for covering the disk-shaped holder.

According to another preferred embodiment, another end of the transparent film projects from a free end of the supporting sheet by a length greater than the thickness of the supporting sheet.

According to still another preferred embodiment, the thickness of the lower holder frame is at least 0.1 millimeter.

According to still another preferred embodiment, the upper and lower holder frames are is made of plastics.

According to a preferred embodiment, the supporting sheet is made of the same material as the lower and upper holder frames.

According to another preferred embodiment, a device further comprising an original guide frame, disposed between the lower and upper holder frames, having a third opening greater than the original, the third opening spreading over the first opening such that the original is positioned in the third opening between the upper and lower holder frames.

According to still another preferred embodiment, the original guide frame is attached to the lower holder frame.

According to a preferred embodiment, the original guide frame is attached to the upper holder frame.

According to another preferred embodiment, the lower holder frame comprises an adhesive layer on its upper surface surrounding the first opening.

According to still another preferred embodiment, each of the lower holder frame and the upper holder frame respectively has furrows on a surface thereof.

According to a preferred embodiment, the surface having furrows comprises a flexible base sheet and plural slips attached on the flexible base sheet parallel to one another and at predetermined intervals.

According to another preferred embodiment, the supporting sheet has parallel furrows on a surface thereof.

According to a preferred embodiment, the surface having furrows comprises a flexible base sheet and plural slips attached on the flexible base sheet parallel to one another and at predetermined intervals.

According to a preferred embodiment, the disk-shaped holder has an indicator mark thereon, and the supporting sheet has indices such that the relation between the indicator and the indices shows oriention of the disk-shaped holder.

An original is mounted onto the image reading drum with the device of the present invention according to the following steps.

The original is placed in such a position that the area-to-be-scanned of the original corresponds to the openings formed on the upper and lower holder sections.

The mounting device with the original held therein is then affixed to the image reading drum. The lower holder frame and the upper holder frame, each made of a flexible sheet member, bend and adhere to the cylindrical surface of the image reading drum.

The original is read through the openings of the lower and upper holder frame by scanning thereof.

With this mounting device of the invention, the original is attached to the drum via the lower holder frame, which has a predetermined thickness greater than a distance causing Newton's rings. Accordingly, image signals obtained by scanning the original effectively represent an original image without Newton's rings.

This process does not require any specific skill as the technique using powdery stone and allows the original to be easily mounted onto the image reading drum.

The above and further objects and features of the invention will more fully be apparent from the following detailed description with accompanying drawings.

DESCRIPTION OF THE PREFERRED EMBODIMENT

Figure 1:
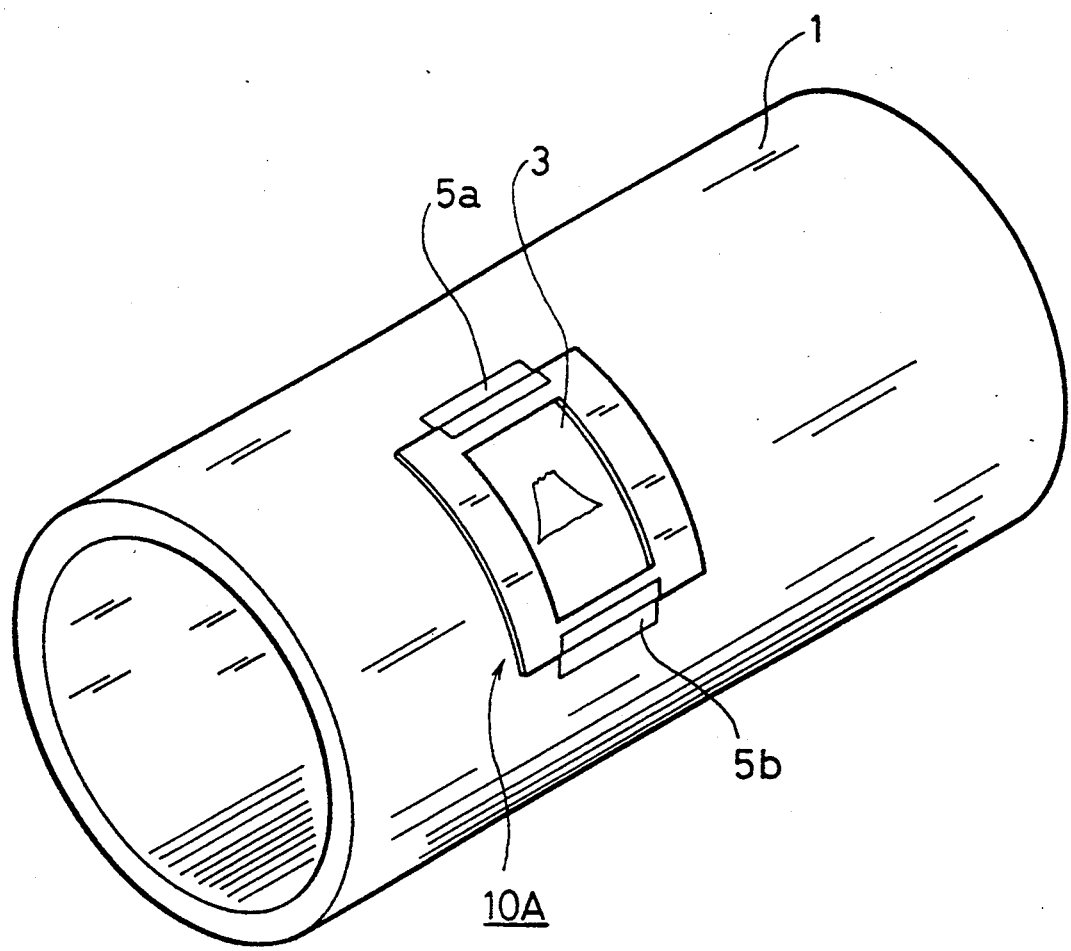
FIG. 1 is a perspective view illustrating a device for mounting an original, designed as a first embodiment of the present invention, being attached to an image reading drum in an image scanning system.

FIG. 1 is a perspective view showing a device 10A for mounting an original 3, designed as a first embodiment of the present invention, being attached onto an image reading drum 1 in an image scanning system.

The image reading drum 1 is a thin-wall cylinder composed of a transparent material such as glass or acrylic. A light source (not shown) is installed inside the image reading drum 1, and a photosensor (not shown) is disposed outside the drum 1. The image scanning system scans an original 3 held in the mounting device 10A with light emitted from the light source while rotating the image reading drum 1. Light successively passes through the image reading drum 1 and the mounting device 10A with the original 3 held therein, and is received by the photosensor to be converted into image signal.

Figure 2:
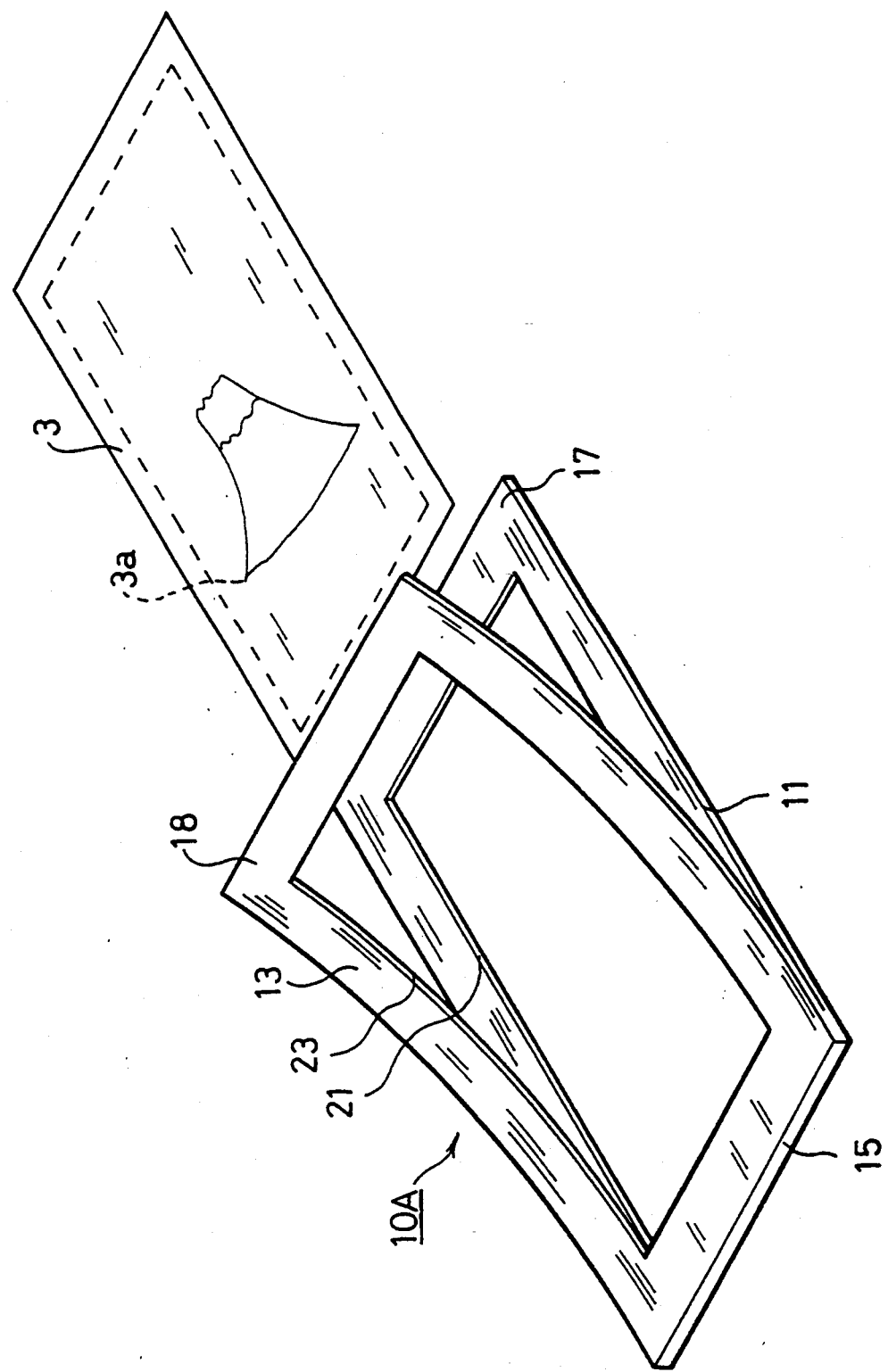
FIG. 2 is a perspective view illustrating the mounting device of the first embodiment.
Figure 3:
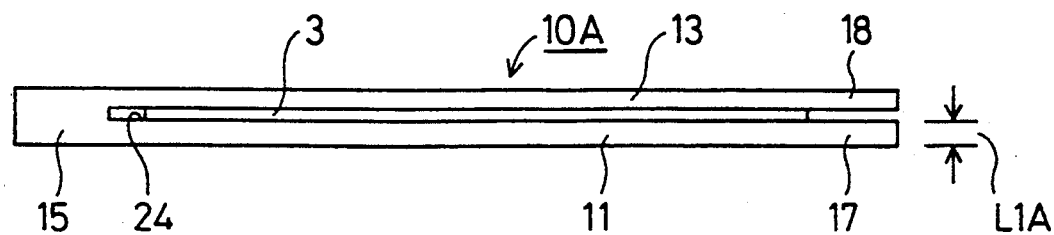
FIG. 3 is a side view showing the mounting device of the first embodiment with an original held therein.

FIG. 2 and FIG. 3 are a perspective view and a side view showing the mounting device 10A, respectively. The mounting device 10A includes a lower holder section 11 and an upper holder section 13, each composed of a flexible but hard plastic sheet. The lower holder section 11 and the upper holder section 13 are integrally joined to each other at a fixing end 15 thereof by thermal pressing or with an adhesive. On the side opposite to the fixing end 15, the holder sections 11 and 13 have free ends 17 and 18.

The lower holder section 11 has dimensions greater than those of the original 3; for example, a lower holder of 12 cm ×25 cm for an original of 4 in. ×5 in. size, having an approximate image area of 9.6 cm ×12.1 cm. The thickness L1A (FIG. 3) of the lower holder section 11 is 0.2 millimeter.

The preferable thickness of the lower holder section 11 to prevent Newton's rings depends on the wavelength of the light and the diameter of the image reading drum 1. For example, the lower holder section 11 preferably has the thickness of at least 0.1 millimeter if the wavelength is in the range of 420$\mu$m to 800$\mu$m and the diameter of the drum is 18 cm.

Both the lower holder section 11 and the upper holder section 13 include openings 21 and 23 of substantially the same area as an area-to-be-scanned 3a of the original 3.

The lower holder section 11 has an adhesive layer 24 containing an adhesive for temporarily supporting the original 3 in the vicinity of the fixing end 15. The adhesive is preferably of a repetitively usable type such that originals can be repeatedly attached to and detached from the adhesive layer 24. This type of adhesive is, for example, sold under the trade name of 'Rimka' by Nichiban Corp.

Figure 4:
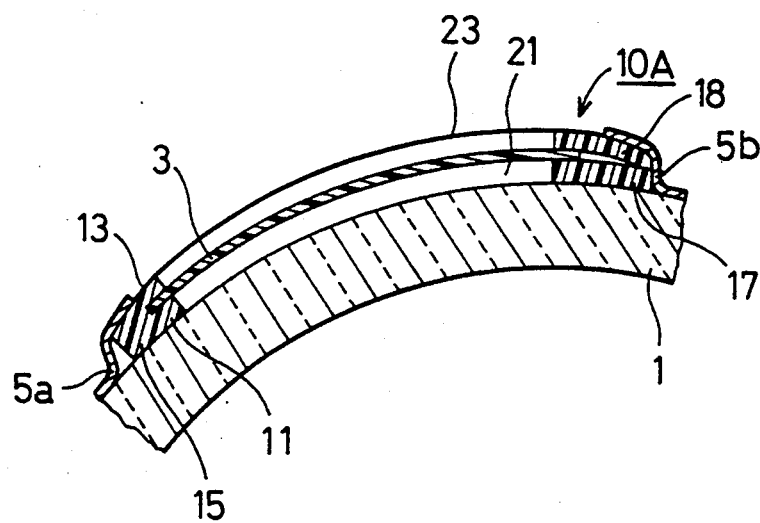
FIG. 4 is a cross sectional view showing the mounting device of the first embodiment attached to the image reading drum.

FIG. 4 is a cross sectional view illustrating the mounting device 10A with the original 3 held therein, being attached to the cylindrical surface of the image reading drum 1. The following are steps for mounting the original 3 onto the image reading drum 1.

The upper holder section 13 is opened away from the lower holder section 11 of the mounting device 10A, and the original 3 is placed between the lower and upper holder sections 11 and 13. The original 3 is temporarily held with the adhesive layer 24 at such a position that the area-to-be-scanned 3a of the original 3 corresponds to the openings 21 and 23 of the holder sections 11 and 13 respectively.

The fixing end 15 of the mounting device 10A is first fastened to the image reading drum 1 with an adhesive tape 5a as seen in FIG. 4. The lower holder section 11 is lightly pressed along the cylindrical surface of the image reading drum 1, and the upper holder section 13 being pressed against the lower holder section 11, so that the holder sections 11 and 13 contact with each other and the lower holder section 13 is in contact with the image reading drum 1. The free end 18 of the upper holder section 13 is then affixed to the image reading drum 1 with an adhesive tape 5b.

After the mounting device 10A with the original 3 held therein is appropriately attached to the image reading drum 1 as described above, the image reading drum 1 is rotated for scanning the original 3. The original 3 is distanced from the image reading drum 1 by the thickness L1A of the lower holder section 11. Since the thickness L1A of the lower holder section 11 (0.2 millimeter) is sufficiently greater than a distance causing Newton's rings, the mounting device 10A of the embodiment can effectively prevent Newton's rings.

Even when the original 3 held in the mounting device 10A is mounted onto the drum 1 under partly undulating conditions, image signals obtained by scanning the original 3 represent an original image without Newton's rings.

Mounting the original 3 on the drum 1 with the mounting device 10A is simple operation, and does not need any skillful operator. Since the free ends 17 and 18 are not joined together, the upper holder section 13 slightly slides on the lower holder section 11 in the circumferential direction of the image reading drum 1, so that the lower holder section 11 and the upper holder section 13 concentrically conform to the cylindrical surface of the image reading drum 1. The original 3 is thereby firmly held between the lower and upper holder sections 11 and 13.

The lower holder section 11 and the upper holder section 13 may be composed of hard plastics to form solid support frames, thus being conveniently transported and not easily deformed.

The mounting device 10A can be formed in various dimensions to be applicable to originals of several different sizes.

Figure 5:
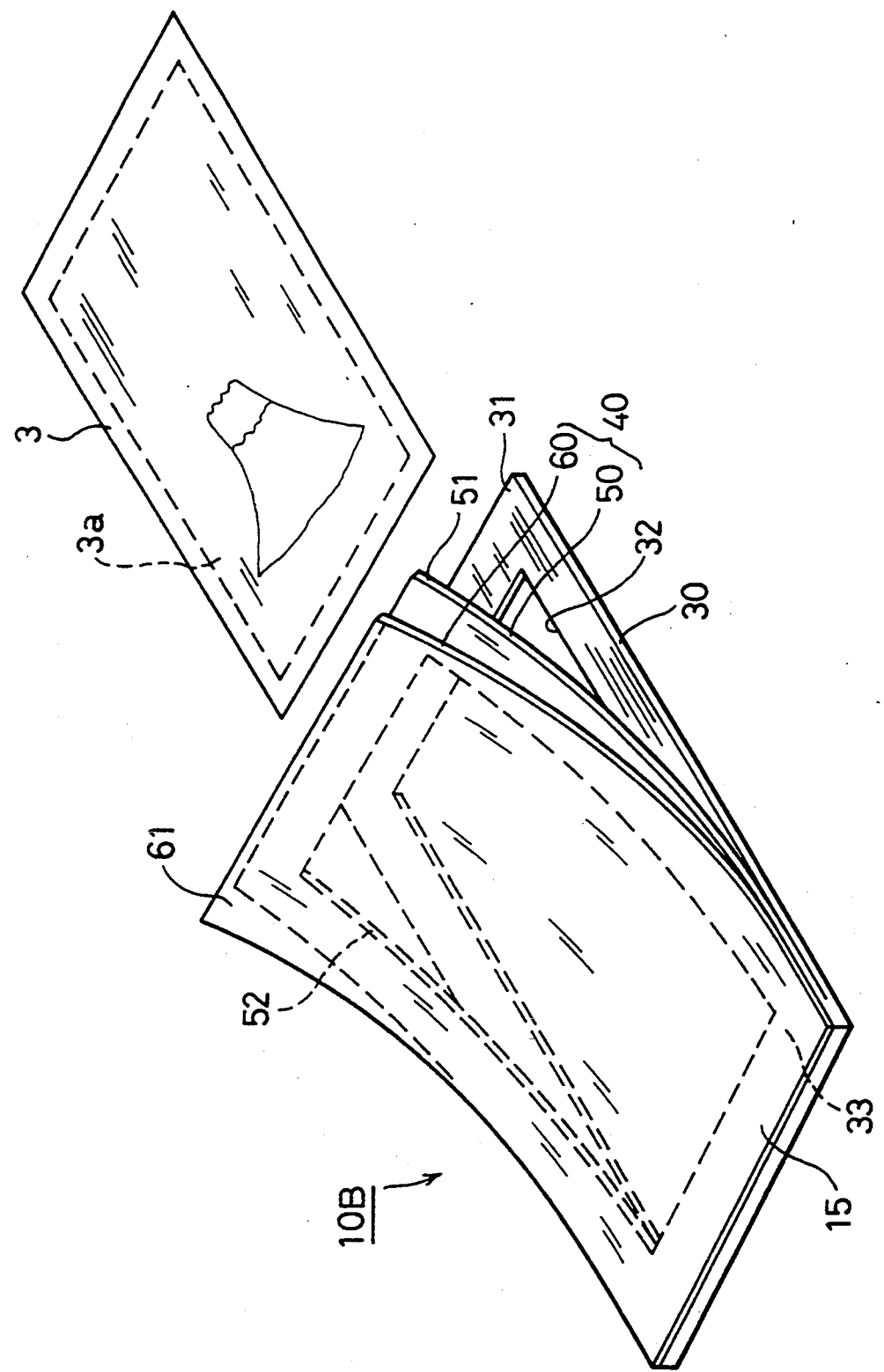
FIG. 5 is a perspective view illustrating a device for mounting an original, designed as a second embodiment of the invention.
Figure 6:
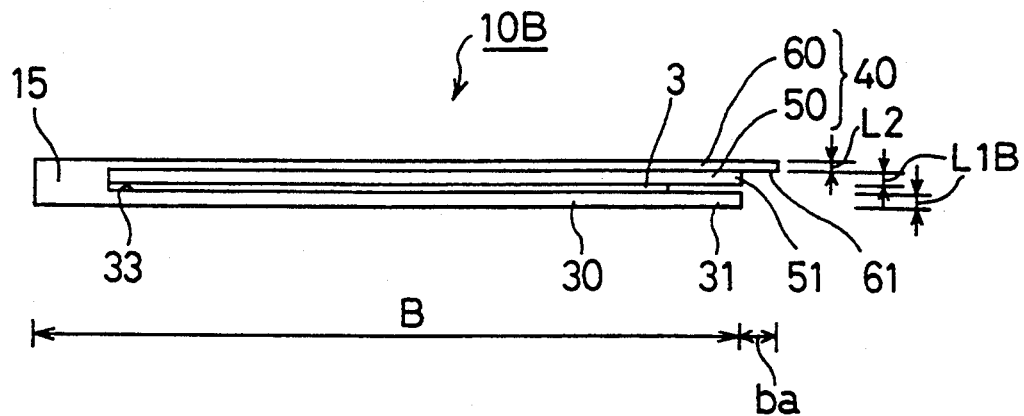
FIG. 6 is a side view showing the mounting device of the second embodiment with an original held therein.

FIG. 5 is a perspective view illustrating another original mounting device 10B constructed as a second embodiment of the invention, and FIG. 6 is a side view showing the mounting device 10B.

The mounting device 10B includes a lower holder section 30 and an upper holder section 40. The upper holder section 40 comprises a support member 50 for holding an original 3 with the lower holder section 30 and a transparent film element 60 laid on the support member 50.

The lower holder section 30, the support member 50, and the transparent film element 60 are integrally joined to one another at a fixing end 15 thereof by thermal pressing or with an adhesive. On the side opposite to the fixing end 15, the lower holder section 30, the support member 50, and the film element 60 have free ends 31, 51, and 61, respectively.

The lower holder section 30 and the support member 50 are made of a flexible but hard plastic sheet. The transparent film element 60 is made of colorless, transparent plastics such as polyethylene terephthalate (PET) or polyester.

The lower holder section 30 has dimensions greater than those of the original 3; for example, 12 cm (width) ×15 cm (length B) for the original of 4 in.×5 in. size (having an image area of 9.6 cm ×12.1 cm). The thickness L1B of the lower holder section 30 is 0.16 millimeter. The support member 50 of the upper holder section 40 has the same area and thickness as the lower holder section 30. The transparent film element 60 has the length greater than the length B of the lower holder section 30 by a distance ba, for example, 10 millimeters, and has the thickness L2 of 0.1 millimeter.

The lower holder section 30 and the support member 50 include openings 32 and 52 of substantially the same area as the area-to-be-scanned 3a of the original 3. The transparent film element 60 is a uniformly formed sheet without an opening and covers over the opening 52 of the support member 50.

The lower holder section 30 has an adhesive layer 33 containing an adhesive for temporarily supporting the original 3 in the vicinity of the fixing end 15.

Figure 7:
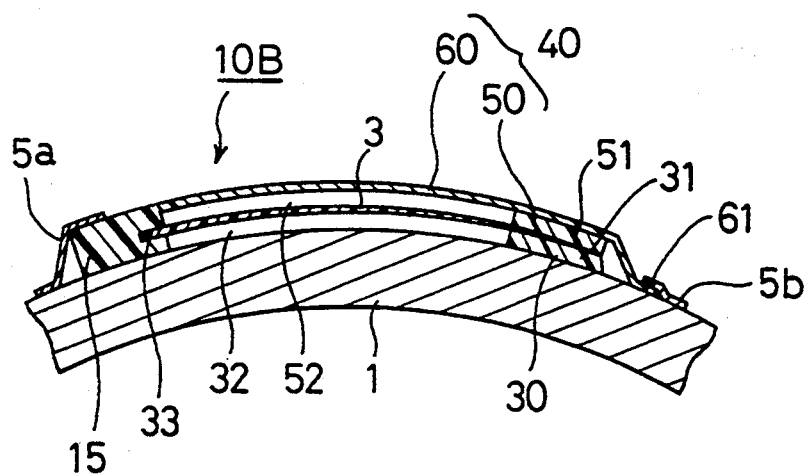
FIG. 7 is a cross sectional view showing the mounting device of the second embodiment attached to the image reading drum.

FIG. 7 is a cross sectional view illustrating the mounting device 10B with the original 3 held therein, being attached to the cylindrical surface of the image reading drum 1. The following are steps for mounting the original 3 onto the image reading drum 1.

The free ends 51 and 61 of the support member 50 and the transparent film element 60 are lifted together away from the lower holder section 30, and the original 3 is placed between the lower holder sections 30 and the support member 50. The original 3 is temporarily held with the adhesive layer 33 at such a position that the area-to-be-scanned 3a of the original 3 corresponds to the openings 32 and 52 of the lower holder section 30 and the support member 50.

The fixing end 15 of the mounting device 10B is first fastened to the image reading drum 1 with an adhesive tape 5a as seen in FIG. 7. The lower holder section 30 is lightly pressed along the cylindrical surface of the image reading drum 1 while the support member 50 being pressed against the lower holder section 30 and the transparent film element 60 against the support member 50, so that the lower holder sections 30, the support member 50, and the transparent film element 60 contact with each other in this order and the lower holder section 30 with the image reading drum 1. The free end 61 of the transparent film element 60 is then affixed to the image reading drum 1 with an adhesive tape 5b.

After the mounting device 10B with the original 3 held therein is appropriately attached to the image reading drum 1 as described above, the image reading drum 1 is rotated for scanning the original 3. The original 3 is distanced from the image reading drum 1 by the thickness L1B of the lower holder section 30. Since the thickness L1B of the lower holder section 30 (0.16 millimeter) is sufficiently greater than a distance causing Newton's rings, the mounting device 10B of the embodiment can effectively prevent Newton's rings.

Since the support member 50 has the same thickness L1B as the lower holder section 30, the member 50 efficiently prevents Newton's rings between the transparent film element 60 and the original 3.

The mounting device 10B of the second embodiment exerts similar effects to the first embodiment.

Since the free ends 31, 51, and 61 are not joined together, the support member 50 slightly slides on the lower holder section 30 on attachment of the mounting device 10B to the image reading drum 1. As a result, the original 3 is properly and firmly held in between the lower holder section 30 and the support member 50. Since the transparent film element 60 is fixed to the support member 50 only at the fixing end 15, the element 60 does not cause deformation or distortion of the support member 50 on the image reading drum 1.

The opening 52 of the support member 50 reduces the strength of the free end 51. If the free end 51 were affixed to the image reading drum 1 with the adhesive tape 5b, stress would be concentrated on both sides of the free end 51 and damage the parts adjacent to the sides of the free end 51. Actually, however, the transparent film element 60 exerts pressure uniformly over the support member 50, thus preventing the support member 50 from being damaged at the sides of its free end 51.

The transparent film element 60 is made of colorless, transparent material, thus having substantially no effect on image signals to be obtained.

The transparent film element 60 is longer than the lower holder section 30 by a length ba. Accordingly, the free end 61 of the transparent film element 60 sufficiently covers the free ends 31 and 51 of the lower holder section 30 and the support member 50, and goes down to the image reading drum 1 to be stuck thereon with the adhesive tape 5b. Thus the mounting device 10B is closely attached to the image reading drum 1 irrespective of the total thickness (2 ×L1B) of the lower holder section 30 and the support member 50.

The lower holder section 30 and the support member 50 are composed of flexible but hard plastics and are further reinforced with the transparent film element 60, thus being conveniently transported and not easily deformed.

The support member 50 and the transparent film element 60 can be formed as a unitary upper holder section 40. In such a case, the support member 50 and the transparent film element 60 move unitedly to prevent the original 3 from being mistakenly inserted therebetween. Furthermore, the unitary upper holder section enhances its durability.

Figure 8:
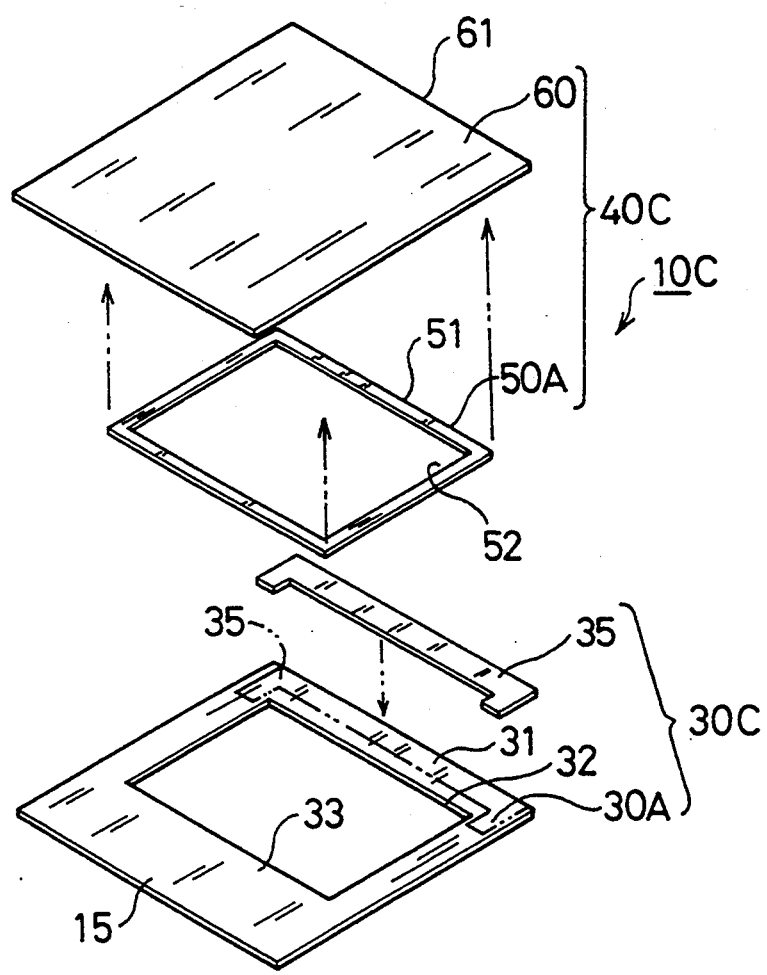
FIG. 8 is an exploded perspective view illustrating a device for mounting an original, designed as a third embodiment of the invention.

FIG. 8 is a decomposed perspective view illustrating another original mounting device 10C constructed as a third embodiment of the invention.

A lower holder section 30C includes: a base element 30A with an opening 32; and a U-shaped positioning guide element 35, which is fixed to a free end 31 of the base element 30A.

An upper holder section 40C includes: a transparent film element 60; and a support member 50A of a sheet frame having an opening 52. The opening 52 is a little smaller than the original 3, which is attached to the lower face of the transparent film element 60. The transparent film element 60 is integrally joined to the support member 50A, and they are affixed to the lower holder section 30C at a fixing end 15 thereof.

In the third embodiment, the support member 50A and the transparent film element 60 are integrally formed to prevent the original 3 from being mistakenly inserted therebetween and to enhance the durability of the upper holder section 40C. The positioning guide element 35 of the lower holder section 30C helps to accurately and precisely locate the original 3, thus preventing an undesirable shift of the original 3 from the scanned position and assuring desirable scanning of the original image.

Figure 9:
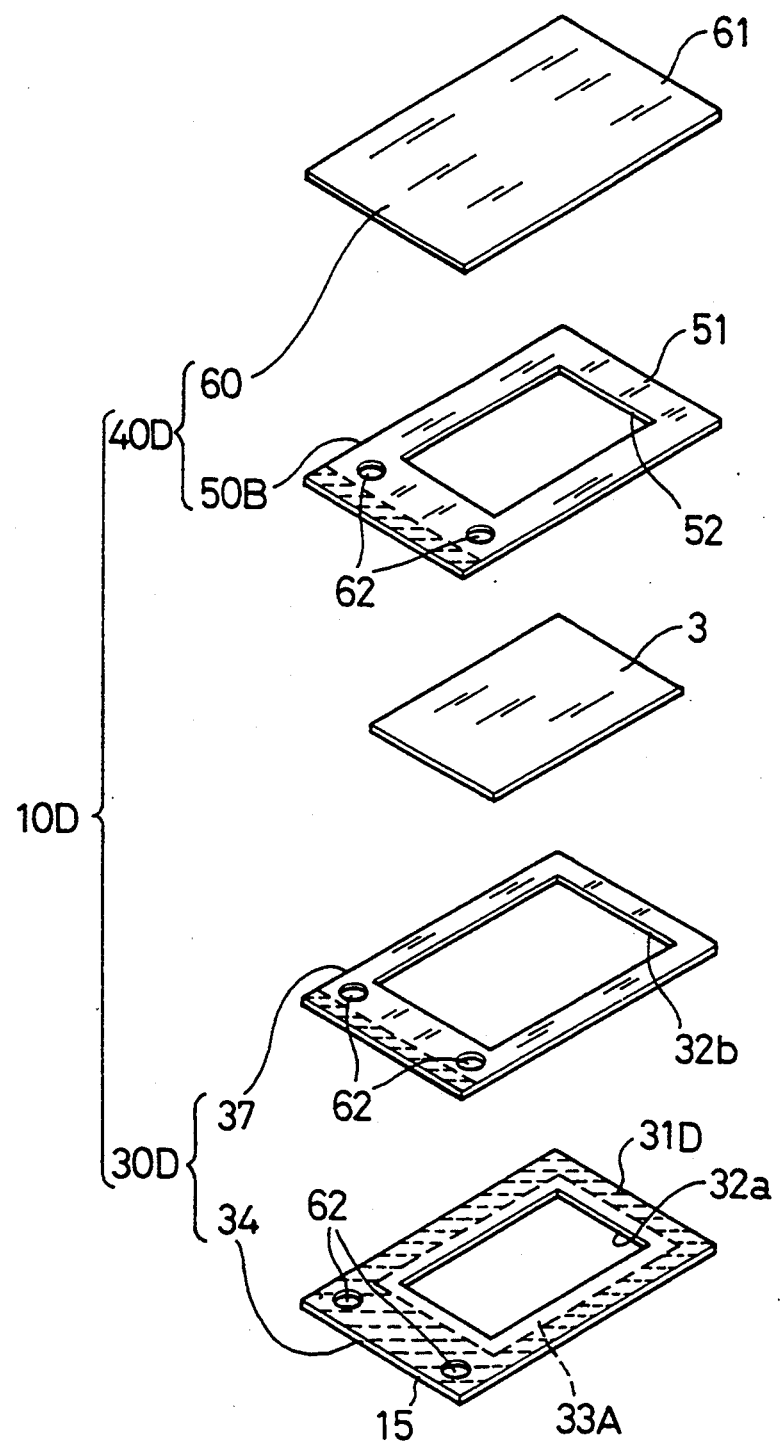
FIG. 9 is an exploded perspective view illustrating a device for mounting an original, designed as a fourth embodiment of the invention.
Figure 10:
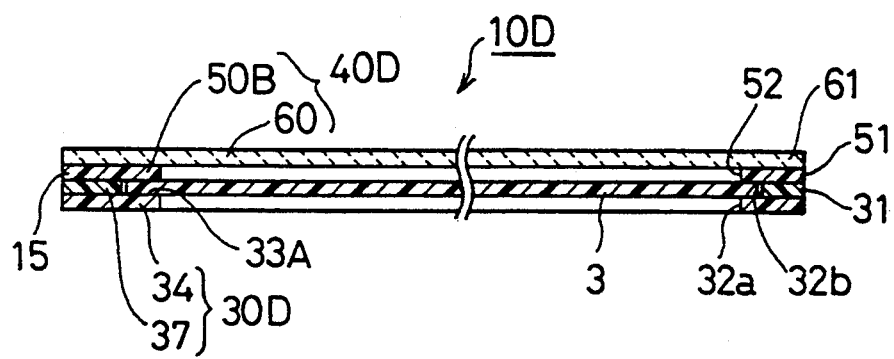
FIG. 10 is a cross sectional view showing the mounting device of the fourth embodiment.

FIG. 9 is a decomposed perspective view illustrating another original mounting device 10D constructed as a fourth embodiment of the invention. FIG. 10 is a cross sectional view showing the mounting device 10D.

In the fourth embodiment, a lower holder section 30D includes: a base element 34 with an opening 32a; and a positioning guide element 37 with an opening 32b, most part of which is stuck to the base element 34 with an adhesive. The opening 32a of the base element 34 has an area smaller than the original 3, while the opening 32b of the positioning guide element 37 has an area greater than the original 3. Since the opening 32b is greater than the opening 32a, part of the base element 34 surrounding the opening 32a does not overlap with the positioning guide element 37. The non-overlapped part of the base element 34 is provided with an adhesive layer 33A containing repetitively usable adhesive for temporarily supporting the original 3.

An upper holder section 40D includes: a support member 50B joined to the positioning guide element 37 at a fixing end 15 thereof; and a transparent film element 60 stuck to the support member 50B at the fixing end 15. The support member 50B has an opening 52 which is a little smaller than the original 3 in area, and the transparent film element 60 has the same dimensions as the outer dimensions of the support member 50B.

The base element 34, the positioning guide element 37, the support member 50B, and the transparent film element 60 are joined to one another at the fixing end 15. Adhesive is applied to the areas shaded with broken lines in FIG. 9 to fix the elements to each other. The thickness of the guide element 37 is preferably no more than that of the original 3.

The original 3 is held in the mounting device 10D in a similar manner to the above embodiments. Namely, the original 3 is temporarily supported on the adhesive layer 33A on the base element 34 of the lower holder section 30D. The opening 32b of the positioning guide element 37 helps the operator check the position of the original 3.

At the fixing end 15 of the mounting device 10D, two through holes 62 are formed, which go through the base element 34, the positioning guide element 37, and the support member 50B. The through holes 62 are used for calibration; that is, they are used to correct the sensitivity of the photosensor, which is disposed outside the drum 1, based on the quantity of light passing through the transparent film element 60 and the image reading drum 1.

Figure 11:
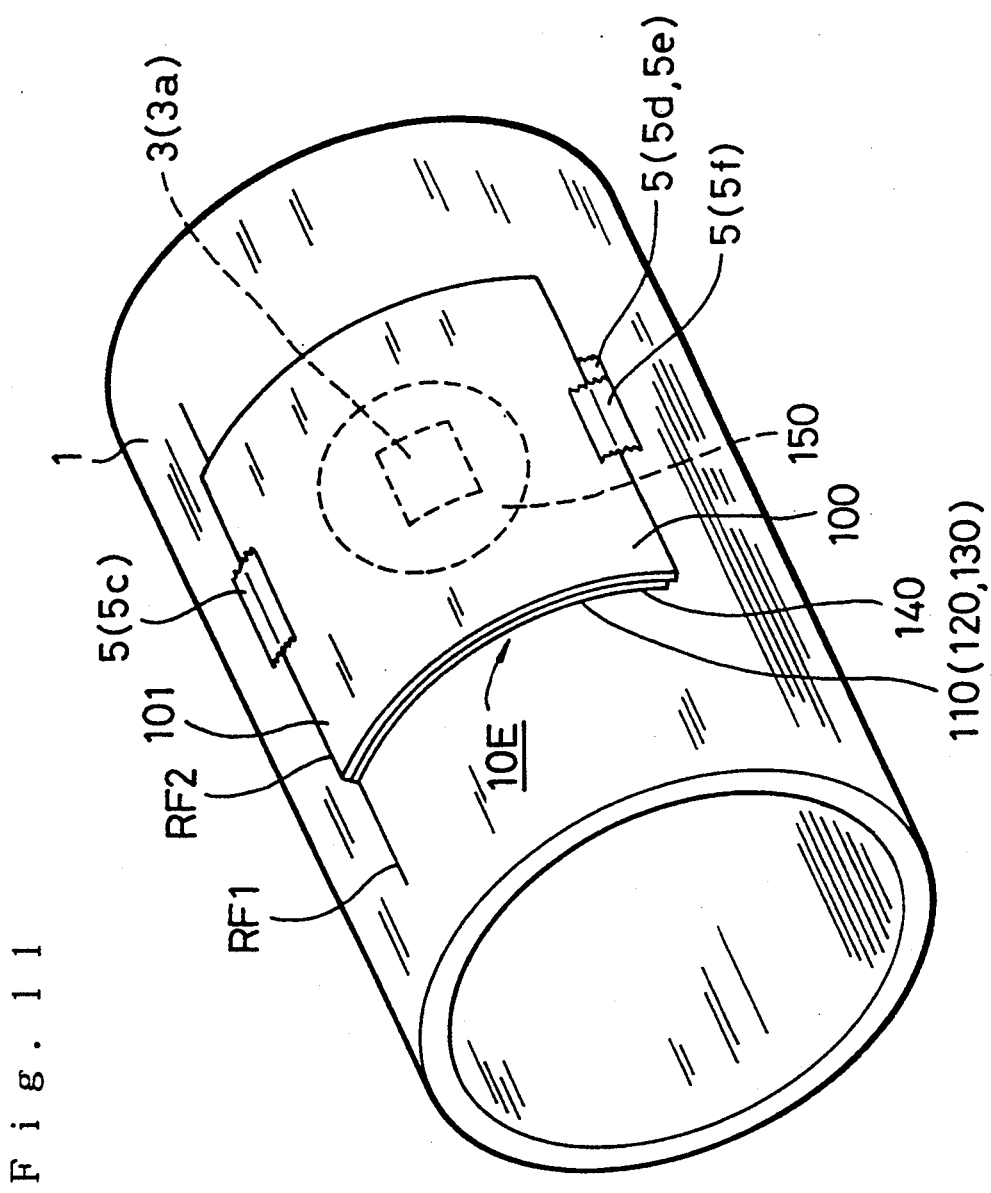
FIG. 11 is a perspective view illustrating a device for mounting an original, designed as a fifth embodiment of the invention, being attached to an image reading drum in an image scanning system.
Figure 12:
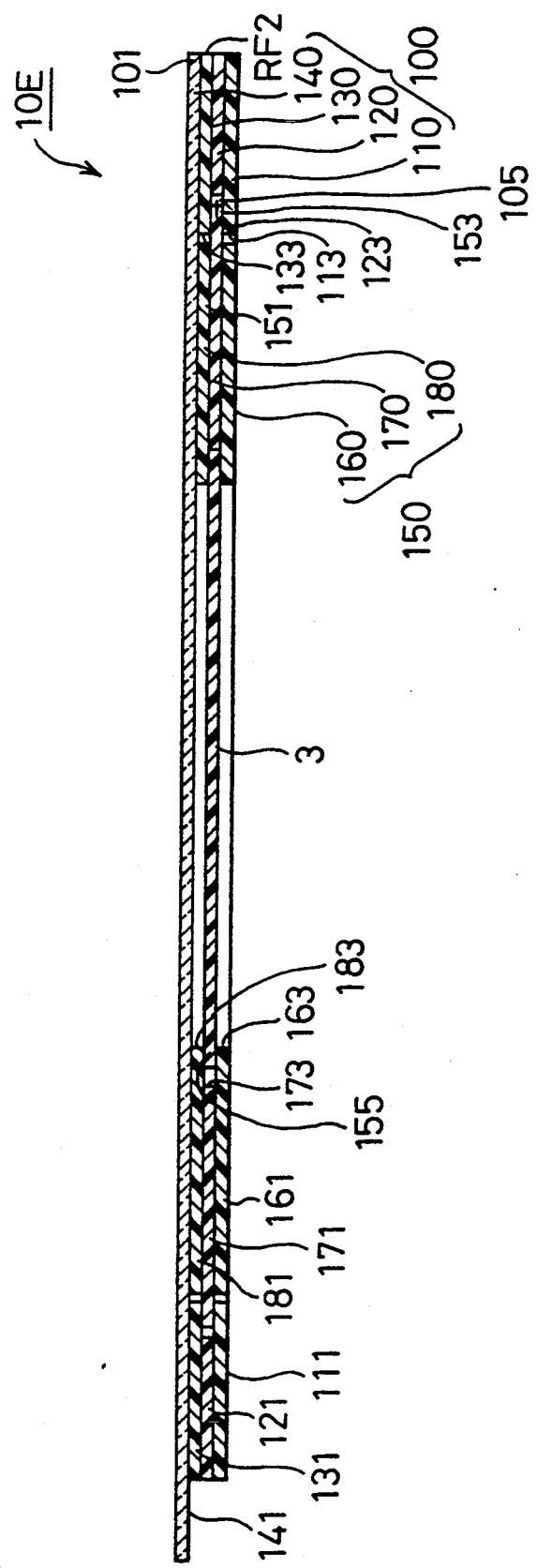
FIG. 12 is a cross sectional view showing the mounting device of the fifth embodiment with an original held therein.
Figure 13:
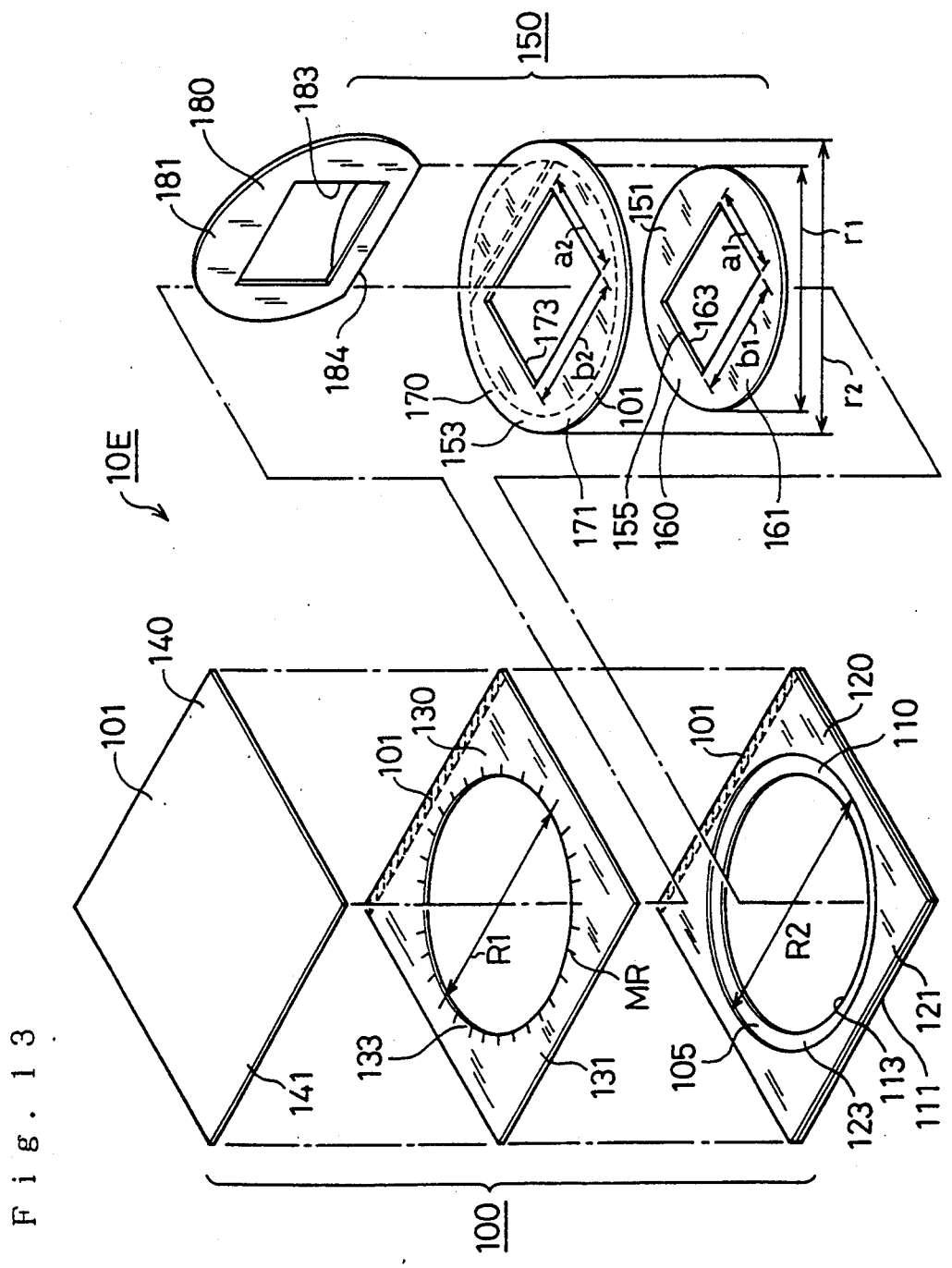
FIG. 13 is a decomposed perspective view illustrating the mounting device of the fifth embodiment.

FIGS. 11 through 13 show a fifth embodiment according to the invention. FIG. 11 is a perspective view showing a mounting device 10E with an original 3 held therein, being attached to the image reading drum 1 with an adhesive tape 5. FIG. 12 and FIG. 13 are a cross sectional view and a decomposed perspective view showing the mounting device 10E, respectively.

The mounting device 10E includes a supporting sheet member 100 and a disk-shaped holder 150.

The supporting sheet member 100 includes a lower sheet element 110, a middle sheet element 120, an upper sheet element 130, and a transparent film element 140. The lower, middle, and upper sheet elements 110, 120, and 130, and the transparent film element 140 are joined to one another at a fixing end 101 thereof by thermal pressing or with an adhesive. On the side opposite to the fixing end 101, the elements 110, 120, 130, and 140 have free ends 111, 121, 131, and 141, respectively.

The lower sheet element 110, the middle sheet element 120, and the upper sheet element 130 respectively have openings, 113, 123, and 133.

The lower opening 113 and the upper opening 133 are circles of an identical inner diameter R1 of 170 mm while the middle opening 123 is a circle having an inner diameter R2 of 180 mm, which is greater than R1 as seen in FIG. 13. The difference between the diameters R1 and R2 makes a ring support part 105 on the supporting member 100 for rotatably supporting the disk-shaped holder 150. The ring support 105 is defined by the middle opening 123.

The transparent film element 140 is a uniformly formed sheet without an opening and covers over the upper sheet element 130.

The lower sheet element 110, the middle sheet element 120, and the upper sheet element 130 are squares of 220 mm×220 mm, and the transparent film element 140 is a rectangle of 220 mm×230 mm.

The disk-shaped holder 150 includes a lower holder disk 160, a middle holder disk 170, and an upper holder disk 180. The lower, middle, and upper holder disks 160, 170, and 180 are made of flexible sheets and joined to one another at a fixing end 151 thereof by thermal pressing or with an adhesive. On the side opposite to the fixing end 151, the holder disks 160, 170, and 180 have free ends 161, 171, and 181, respectively.

The lower holder disk 160 and the upper holder disk 180 have an identical outer diameter r1 of 169 mm, which is a little smaller than the diameter R1 of the lower and upper openings 111 and 133. The middle holder disk 170 has an outer diameter r2 of 179 mm, which is a little smaller than the inner diameter R2 of the middle opening 123. Since the middle holder disk 170 is larger than the lower holder disk 160 and the upper holder disk 180, and the three disks are concentrically arranged the disk-shaped holder 150 has a circular brim 153, which is the circumferential edge of the middle holder disk 170 projecting from the lower holder disk 160 and the upper holder disk 180.

The upper holder disk 180 is bendable at a joint 184.

The lower holder disk 160 and the upper holder disk 180 respectively have openings 163 and 183 of 98 mm (length a1)×123 mm (width b1), which are little greater than the area-to-be-scanned 3a of the original 3. The middle holder disk 170 has an opening 173 of 102 mm (length a2)×127 mm (width b2), which is larger than the openings 163 and 183. The difference of the dimensions of the openings makes a support rim 155 for supporting the original 3. The support rim 155 is a part of the lower holder disk 160 defined by the opening 173 of the middle holder disk 170.

The supporting sheet member 100 and the disk-shaped holder 150 are made of flexible sheet material such as polyethylene terephthalate (PET) or polyester with appropriate strength and flexibility. All the sheet elements, film element, and holder disks have the thickness of 0.17 mm.

The ring support 105 of the supporting sheet member 100 and the support rim 155 of the disk-shaped holder 150 are preferably provided with a low-friction layer made of material with a low frictional coefficient, for example, tetrafluoroethylene. The low-friction layer allows the disk-shaped holder 150 to smoothly rotate against the supporting sheet member 100.

As shown in FIG. 11, a reference line RF1 is drawn parallel to the drum axis on the cylindrical surface of the image reading drum 1, to which a reference end face RF2 at the fixing end 101 of the supporting sheet member 100 is adjusted.

The following are steps for mounting the original 3 onto the image reading drum 1.

Figure 15:
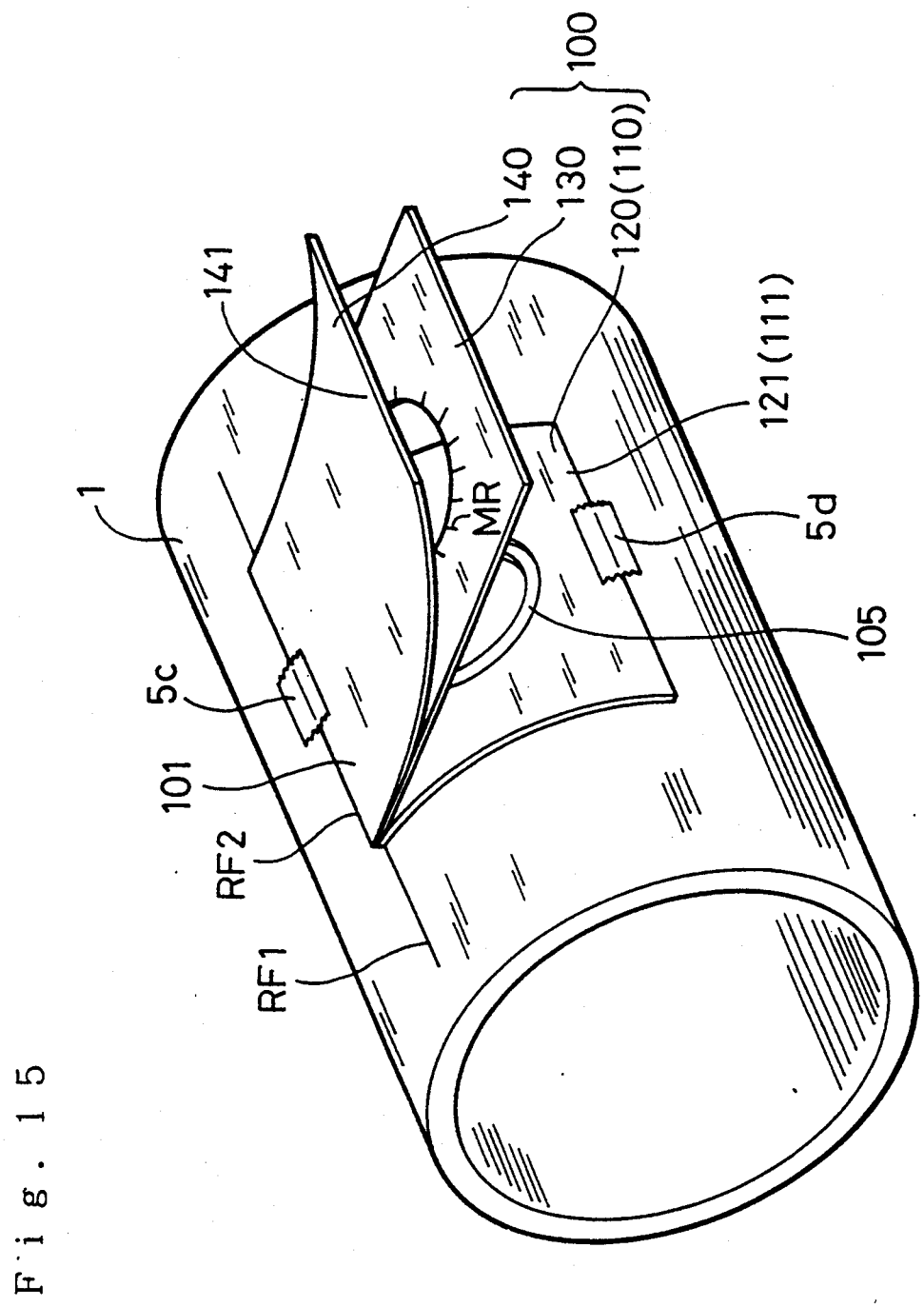
FIG. 15 is a perspective view illustrating attachment of the mounting device of the fifth embodiment with the original held therein to the image reading drum.

As seen in FIG. 15, the reference end face RF2 of the supporting sheet member 100 is adjusted to the reference line RF1 on the image reading drum 1. The fixing end 101 of the supporting sheet member 100 is stuck to the cylindrical surface of the image reading drum 1 with an adhesive tape 5c.

After the lower sheet element 110 is lightly pressed along the cylindrical surface of the image reading drum 1 to adhere thereto, the middle sheet element 120 is laid on the lower sheet element 110 and fastened at the free end 121 to the image reading drum 1 with an adhesive tape 5d. Thus the lower sheet element 110 and the middle sheet element 120 are fixed to the image reading drum 1.

In the disk-shaped holder 150 formed separately from the supporting sheet member 100, the upper holder disk 180 is lifted from the middle holder disk 170, and the original 3 is placed on the support rim 155 on the lower holder disk 160. The middle holder disk 170 is then covered with the upper holder disk 180. According to these steps, the original 3 is held in the disk-shaped holder 150.

The disk-shaped holder 150 with the original 3 held therein is then inserted into the supporting sheet member 100. The upper sheet element 130 is opened, and the disk-shaped holder 150 is placed on the ring support 105.

Figure 16:
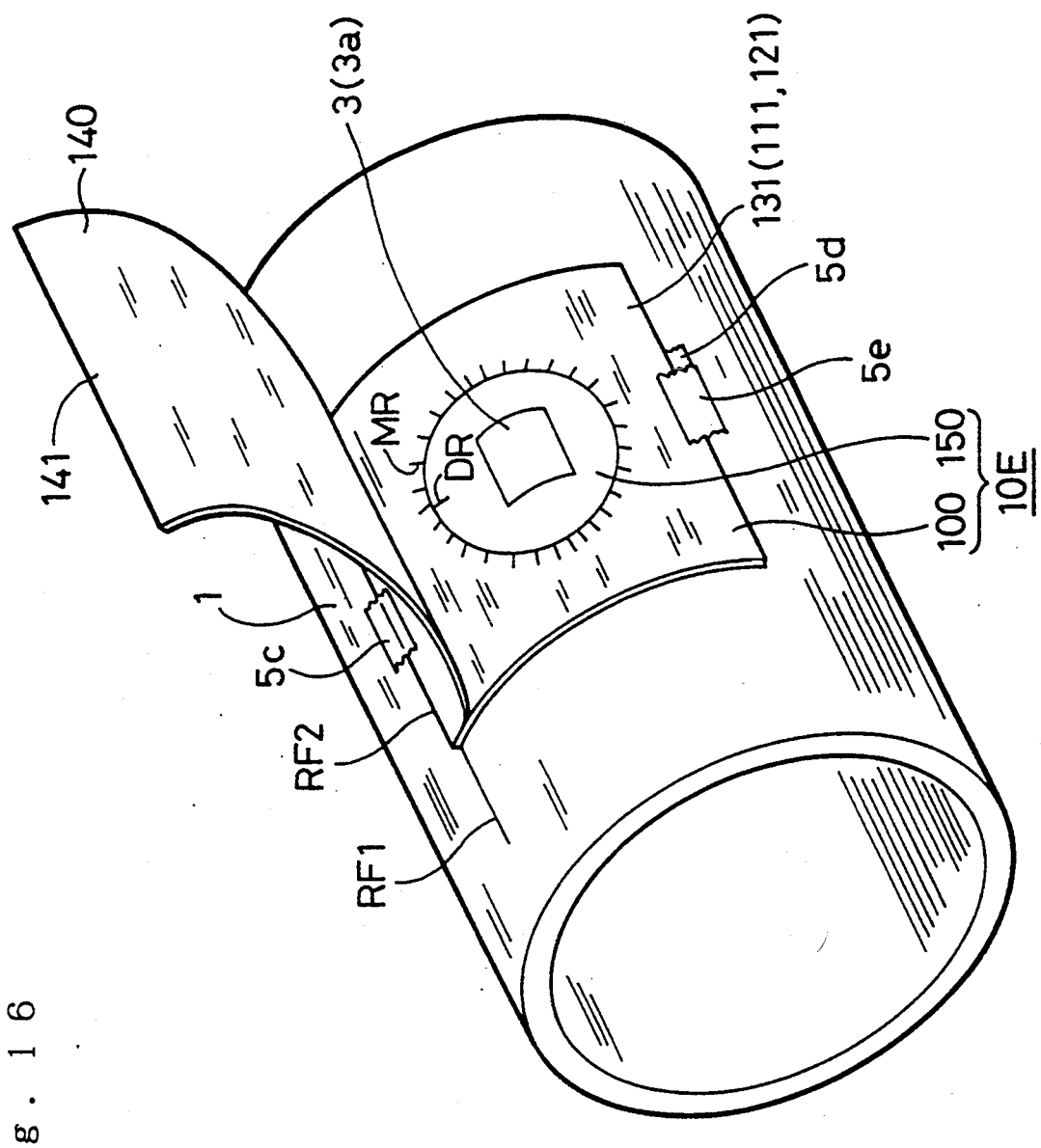
FIG. 16 is a perspective view illustrating attachment of the mounting device of the fifth embodiment with the original held therein to the image reading drum.

The upper sheet element 130 is then laid on the middle sheet element 120 and fastened at the free end 131 to the image reading drum 1 with an adhesive tape 5e as shown in FIG. 16. In this manner, the circular brim 153 of the disk-shaped holder 150 is rotatably placed on the ring support 105 of the supporting sheet member 100.

The orientation of the original 3 is adjusted by rotating the disk-shaped holder 150 on the supporting sheet member 100. An indicator DR marked on the disk-shaped holder 150 is adjusted to indices MR formed on the circumference of the opening 183 of the upper holder disk 180, so that the disk-shaped holder 150 is oriented at a predetermined angle.

The disk-shaped holder 150 is made of flexible sheet material and is thus easily rotated in the bent condition on the image reading drum 1.

After the original 3 is located at the predetermined angle, the transparent film element 140 is laid over the disk-shaped holder 150 and the supporting sheet member 100, and is fastened at the free end 141 to the cylindrical surface of the image reading drum 1 with an adhesive tape 5f (FIG. 11).

The original 3 mounted onto the cylindrical surface of the image reading drum 1 is read through the openings 163, 173, and 183 of the disk-shaped holder 150 with an scanning device of the image scanning system.

Here the lower holder disk 160 of the disk-shaped holder 150 is placed between the image reading drum 1 and the original 3. Since the thickness of the lower holder disk 160 (=0.17 millimeter) is sufficiently greater than a distance causing Newton's rings, the mounting device 10E of the embodiment can effectively prevent Newton's rings.

Even when the original 3 held in the mounting device 10E is mounted onto the drum 1 under partly undulating conditions, image signals obtained by scanning the original 3 effectively represent an original image without Newton's rings.

With the mounting device 10E, after the supporting sheet member 100 is stuck to the image reading drum 1, the disk-shaped holder 150 with the original 3 held therein is attached to the supporting sheet member 100. This process does not require any specific skill as the technique using powdery stone and allows the original 3 to be easily mounted onto the image reading drum 1.

In the mounting device 10E, the disk-shaped holder 150 have the fixing end 151 on one side and the free ends 161, 171, and 181 on the other side. Since the free ends 161, 171, and 181 are not joined together, the lower holder disk 160, the middle holder disk 170, and the upper holder disk 180 of the disk-shaped holder 150 slightly slide against each other in the circumferential direction on attachment of the disk-shaped holder 150 to the image reading drum 1. As a result, the original 3 is properly and closely held in between the lower holder disk 160 and the upper holder disk 180.

The sheet elements of supporting sheet member 100 also have the fixing end 101 on one side and the free ends 111, 121, and 131 on the other side, and slightly slide against each other. Therefore the supporting sheet member 100 does not apply any stress causing undulation of the original 3 to the disk-shaped holder 150.

The supporting sheet member 100 and the disk-shaped holder 150 are made of flexible but hard plastics to form solid support frames, thus being conveniently transported and not easily deformed.

The opening 113, 123, and 133 of the sheet elements 110, 120, and 130 reduce the strength of the free ends 111, 121, and 131, respectively. If the sheet elements 110, 120, and 130 were stuck to the image reading drum 1 with adhesive, stress would be concentrated on the free end 111, 121, and 131, which may damage the part adjacent to the side edge of the free end 111, 121, and 131. Actually, however, the transparent film element 140 applies uniform pressure to the sheet elements 110, 120, and 130 and thus prevents the sheet element 110, 120, and 130 from being damaged at the side edge of their free ends 111, 121, and 131.

Figure 14:
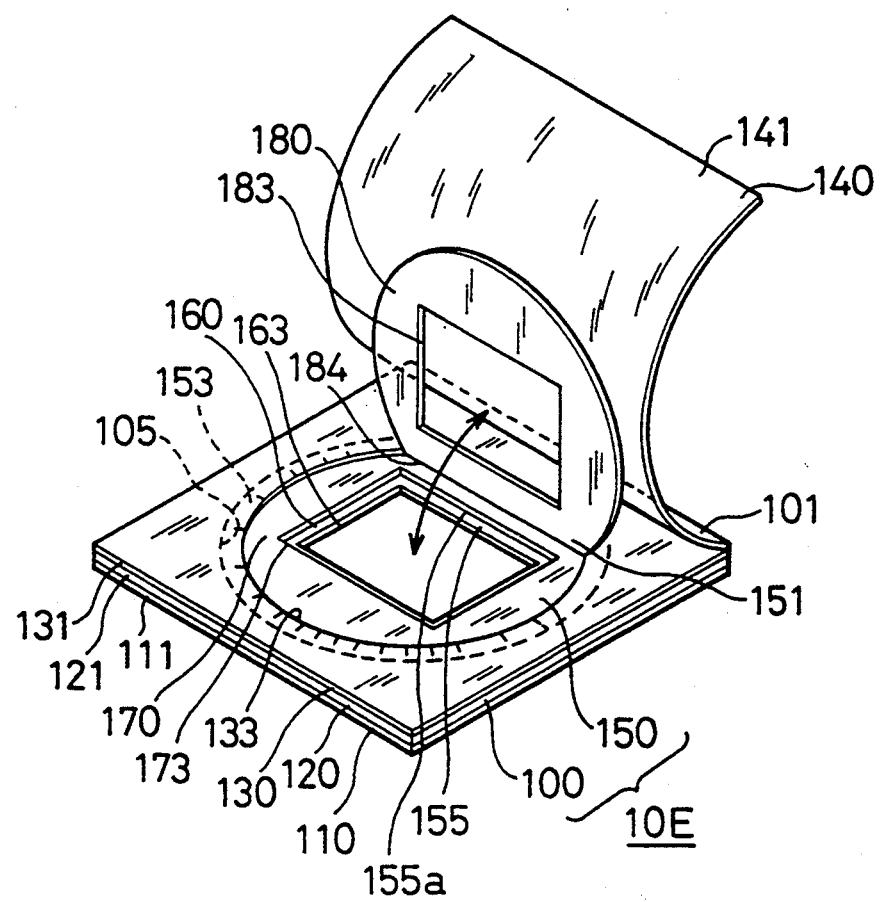
FIG. 14 is a perspective view showing the mounting device of the fifth embodiment in use.

As seen in FIG. 14, the original 3 is placed on the support rim 155 of the holder 150 while the transparent film element 140 is lifted at its free end 141 from the sheet elements, and while the upper holder disk 180 of the disk-shaped holder 150 is bent upward at the joint 184. The original 3 is thus readily replaceable while the supporting sheet member 100 is fixed to the image reading drum 1.

The mounting device 10E is applicable to originals of various sizes by replacing of the disk-shaped holder 150.

An adhesive layer 155a containing adhesive for temporarily supporting the original 3 may be provided, as shown in FIG. 14, on the upper face of the support rim 155 of the disk-shaped holder 150. The adhesive is preferably of an repetitively usable type, for example, sold under the trade name of 'Rimka' by Nichiban Corp.

A sixth embodiment of the invention will be described with reference to the cross sectional view of FIG. 17, the decomposed perspective view of FIG. 18, and the enlarged perspective view of FIG. 19.

A mounting device 10F of the sixth embodiment has a supporting sheet member 100A and a disk-shaped holder 150A, each is thicker and more flexible than the corresponding element of the fifth embodiment.

Figure 19:
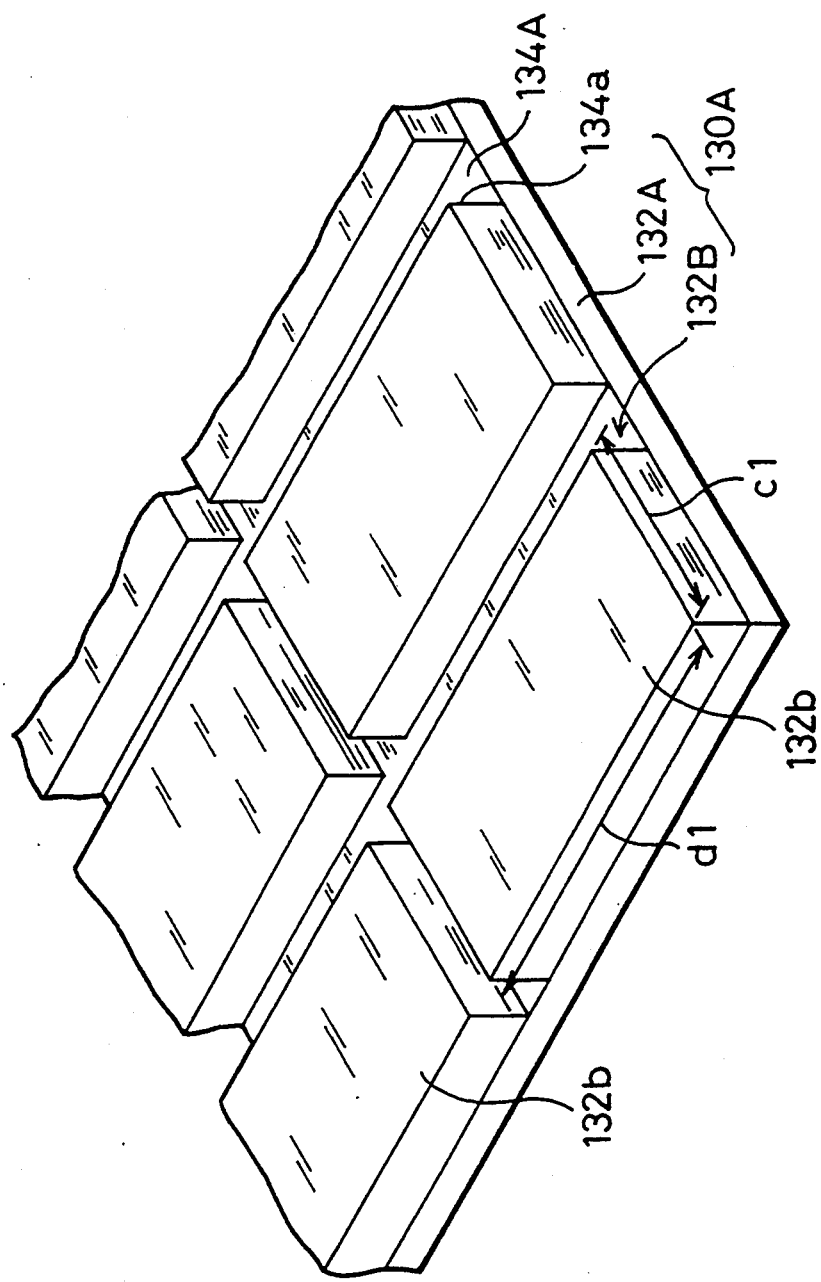
FIG. 19 is a partly broken perspective view showing holder slips used in the mounting device of the sixth embodiment.

An upper sheet element 130A of the supporting sheet member 100A includes, as shown in FIG. 19, a sheet base 132A, and a slip layer 132B including plural sheet slips 132b which adhere to the upper face of the sheet base 132A.

The sheet base 132A is made of a 0.1 millimeter thick flexible sheet and has the shape and the outer dimensions similar to those of the upper sheet element 130 of the fifth embodiment. Each sheet slip 132b has the dimensions of 10 mm (length c1)×20 mm (width d1)×0.17mm (thickness). The plural sheet slips 132b are placed in parallel and series to each other at predetermined intervals (2 mm) on the upper face of the sheet base 132A to form the slip layer 132B.

The slip layer 132B thus includes lattice furrows 134A formed between the sheet slips 132b. Furrows 134a running parallel to the axis of the image reading drum 1 increase flexibility of the upper sheet element 130A on attachment of the mounting device 10F onto the image reading drum 1.

Figure 17:
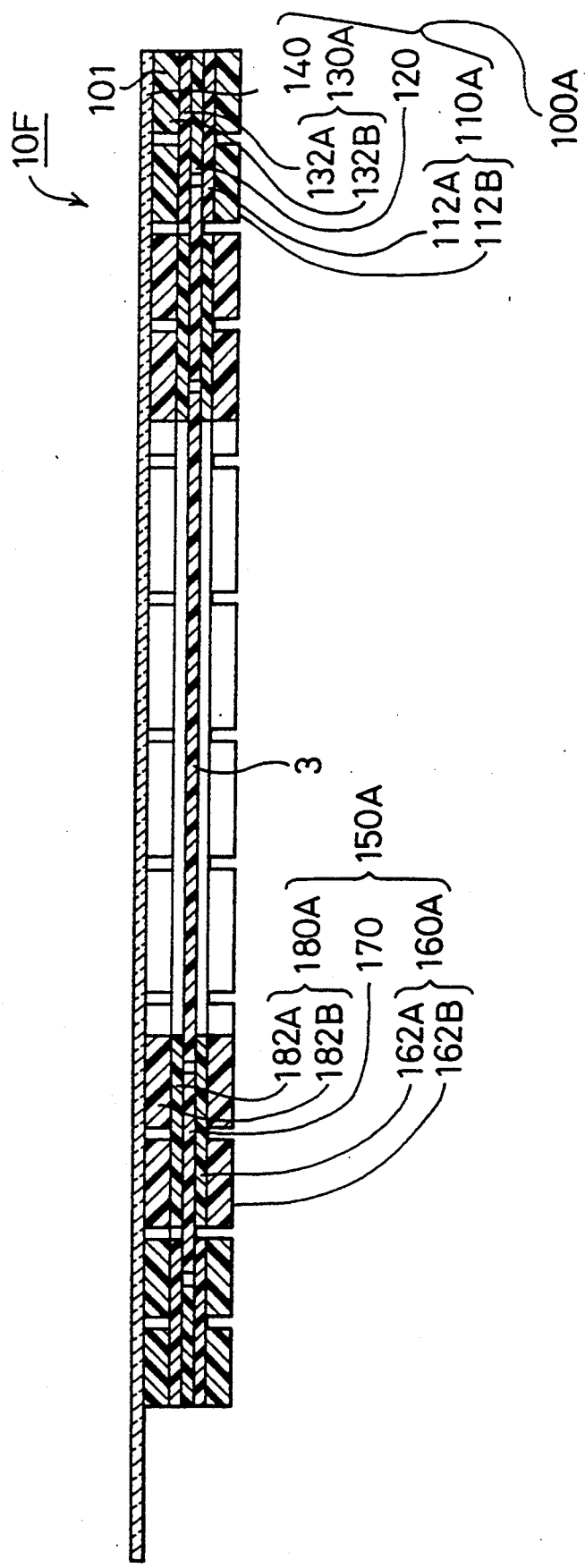
FIG. 17 is a cross sectional view showing a device for mounting an original, designed as a sixth embodiment of the invention.
Figure 18:
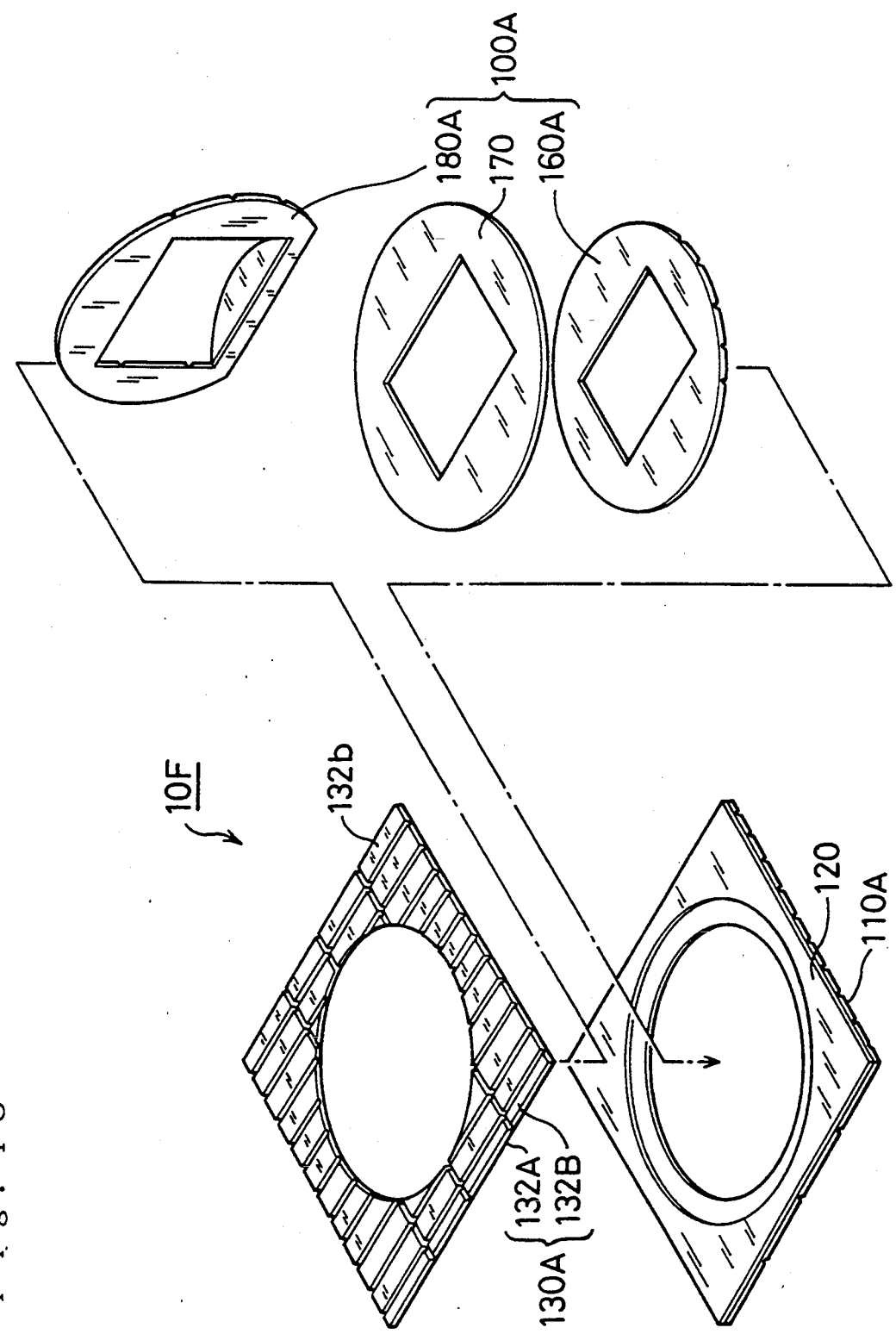
FIG. 18 is a decomposed perspective view illustrating the mounting device of the sixth embodiment.

In the similar manner to the upper sheet element 130A, the lower sheet element 110A includes, as shown in FIG. 17, a sheet base 112A, and a slip layer 112B including plural sheet slips which adhere to the lower face of the sheet base 112A. A lower holder disk 160A and an upper holder disk 180A of the disk-shaped holder 150A respectively include a holder base 162A with a slip layer 162B and a holder base 182A with a slip layer 182B.

In the mounting device 10F of the sixth embodiment, the orientation of the original 3 is adjusted through rotation of the disk-shaped holder 150A, which is inserted into the supporting sheet member 100A. The slip layers 112B, 132B, 162B, and 182B enhance the flexibility of the sheet elements of the member 100A and the disks of the holder 150A to allow close contact to each other down to the cylindrical surface of the image reading drum 1.

The invention may be embodied in other forms without departing from the spirit of essential characteristics of the invention, and the embodiments above are thus only illustrative and not restrictive in any sense.

What is claimed is:

1. A device for mounting an original onto an image reading drum in an image scanning system which reads a signal obtained by light passing through said original and the image reading drum, said device comprising:

a lower holder frame comprising a flexible sheet having a first opening which is smaller than said original;

an upper holder frame comprising a flexible sheet having a second opening corresponding to said first opening, said upper holder frame being fixed to one end of said lower holder frame in substantial alignment with said first opening and said second opening such that said original is held in between said lower holder frame and said upper holder frame; and said lower holder frame having a thickness which maintains said original at a distance sway from the image reading drum sufficient to avoid Newton rings in the signal; and wherein:

said lower holder frame and said upper holder frame form a disk-shaped holder; and said device further comprises a supporting sheet with a circular opening, which said disk-shaped holder fits, for rotatably supporting said disk-shaped holder.

2. A device in accordance with claim 1, further comprising a transparent film, one end of which is fixed to said upper holder frame, for covering said first and second openings.

3. A device in accordance with claim 1, further comprising a transparent film, one end of which is fixed to said supporting sheet, for covering said disk-shaped holder.

4. A device in accordance with claim 3, wherein another end of said transparent film projects from a free end of said supporting sheet by a length greater than the thickness of said supporting sheet.

5. A device in accordance with claim 4, wherein said disk-shaped holder comprises an original guide frame, disposed between said upper and lower holder frames, having a third opening greater than said original, said third opening spreading over said first opening such that said original is positioned in said third opening between said upper and lower holder frames.

6. A device in accordance with claim 5, wherein:

said original guide frame has a circular shape greater than said lower and upper holder frames; and said supporting sheet has a ring support part of a terraced shape on the circumference of said circular opening on which said original guide frame is rotatably disposed.

7. A device for mounting an original onto an image reading drum in an image scanning system which reads a signal obtained by light passing through said original and the image reading drum, said device comprising;

a lower holder frame comprising a flexible sheet having a first opening which is smaller than said original;

an upper holder frame comprising a flexible sheet having a second opening corresponding to said first opening, said upper holder frame being fixed to one end of said lower holder frame in substantial alignment with said first opening and said second opening such that said original is hold in between said lower holder frame and said upper holder frame; and said lower holder frame having a thickness which maintains said original at a distance away from the image reading drum sufficient to avoid Newton rings in the signal; and further comprising a transparent film, one end of which is fixed to said upper holder frame, for covering said first and second openings;

wherein another end of said transparent film projects from a free end of said upper holder frame by a length greater than the total thickness of said lower holder frame and said upper holder frame.

8. A device in accordance with claim 7, wherein said upper and lower holder frames are made of plastics.

9. A device in accordance with claim 7, wherein the thickness of said lower holder frame is at least 0.1 millimeter.

10. A device for mounting an original onto an image reading drum in an image scanning system, said device comprising:

a lower holder frame comprising a flexible sheet having a first opening which is smaller than said original, and a positioning guide, said positioning guide being fixed to said flexible sheet;

an upper holder element comprising a transparent film and a support member frame fixed to a lower face of said transparent film, said support member frame having a second opening corresponding to said first opening;

said transparent film of said upper holder element being coupled to said lower holder frame in such a manner that said support member frame of said upper holder element is in substantial alignment with said positioning guide of said lower holder frame.

11. A device for mounting an original onto an image reading drum in an image scanning system which reads a signal obtained by light passing through said original and the image reading drum, said device comprising;

a lower holder frame comprising a flexible sheet having a first opening which is smaller than said original;

an upper holder frame comprising a flexible sheet having a second opening corresponding to said first opening, said upper holder frame being fixed to one end of said lower holder frame in substantial alignment with said first opening and said second opening such that said original is held in between said lower holder frame and said upper holder frame; and said lower holder frame having a thickness which maintains said original at a distance away from the image reading drum sufficient to avoid Newton rings in the signal; and wherein said lower holder frame and said upper holder frame form a disk-shaped holder; and said device further comprises a supporting sheet with a circular opening, which said disk-shaped holder fits, for rotatably supporting said disk-shaped holder;

wherein said supporting sheet is made of flexible plastic sheet and said lower and upper holder frames are made of flexible plastic sheet.

12. A device for mounting an original onto an image reading drum in an image scanning system which reads a signal obtained by light passing through said original and the image reading drum, said device comprising:

a lower holder frame comprising a flexible sheet having a first opening which is smaller than said original;

an upper holder frame comprising a flexible sheet having a second opening corresponding to said first opening, said upper holder frame being fixed to one end of said lower holder frame in substantial alignment with said first opening and said second opening such that said original is held in between said lower holder frame and said upper holder frame; and said lower holder frame having a thickness which maintains said original at a distance sway from the image reading drum sufficient to avoid Newton rings in the signal; and further comprising an original guide frame, disposed between said lower and upper holder frames, having a third opening greater than said original, said third opening spreading over said first opening such that said original is positioned in said third opening between said upper and lower holder frames.

13. A device in accordance with claim 12, wherein said original guide frame is attached to said lower holder frame.

14. A device in accordance with claim 12, wherein said original guide frame is attached to said upper holder frame.

15. A device for mounting an original onto an image reading drum in an image scanning system which reads a signal obtained by light passing through said original and the image reading drum, said device comprising:
- a lower holder frame comprising a flexible sheet having a first opening which is smaller than said original;
- an upper holder frame comprising a flexible sheet having a second opening corresponding to said first opening, said upper holder frame being fixed to one end of said lower holder frame in substantial alignment with said first opening and said second opening such that said original is held in between said lower holder frame and said upper holder frame; and
- said lower holder frame having a thickness which maintains said original at a distance away from the image reading drum sufficient to avoid Newton rings in the signal; and wherein:
said lower holder frame comprises an adhesive layer on an upper surface thereof surrounding said first opening, said adhesive layer being disposed and adapted for temporarily fixing an original to the lower holder frame.

16. A device for mounting an original onto an image reading drum in an image scanning system which reads a signal obtained by light passing through said original and the image reading drum, said device comprising:
- a lower holder frame comprising a flexible sheet having a first opening which is smaller than said original;
- an upper holder frame comprising a flexible sheet having a second opening corresponding to said first opening, said upper holder frame being fixed to one end of said lower holder frame in substantial alignment with said first opening and said second opening such that said original is held in between said lower holder frame and said upper holder frame; and
- said lower holder frame having a thickness which maintains said original at a distance away from the image reading drum sufficient to avoid Newton rings in the signal; and
- wherein each of said lower holder frame and said upper holder frame respectively has furrows on a surface thereof.

17. A device in accordance with claim 16, wherein said surface having furrows comprises a flexible base sheet and plural slips attached on said flexible base sheet parallel to one another and at predetermined intervals.

18. A device for mounting an original onto an image reading drum in an image scanning system which reads a signal obtained by light passing through said original and the image reading drum, said device comprising:
- a lower holder frame comprising a flexible sheet having a first opening which is smaller than said original;
- an upper holder frame comprising a flexible sheet having a second opening corresponding to said first opening, said upper holder frame being fixed to one end of said lower holder frame in substantial alignment with said first opening and said second opening such that said original is held in between said lower holder frame and said upper holder frame; and
- said lower holder frame having a thickness which maintains said original at a distance away from the image reading drum sufficient to avoid Newton rings in the signal; and wherein:
said lower holder frame and said upper holder frame form a disk-shaped holder; and
said device further comprises a supporting sheet with a circular opening, which said disk-shaped holder fits, for rotatably supporting said disk-shaped holders; wherein said supporting sheet has parallel furrows on a surface thereof.

19. A device in accordance with claim 18, wherein said surface having furrows comprises a flexible base sheet and plural slips attached on said flexible base sheet parallel to one another and at predetermined intervals.

20. A device for mounting an original onto an image reading drum in an image scanning system which reads a signal obtained by light passing through said original and the image reading drum, said device comprising:
- a lower holder frame comprising a flexible sheet having a first opening which is smaller than said original;
- an upper holder frame comprising a flexible sheet having a second opening corresponding to said first opening, said upper holder frame being fixed to one end of said lower holder frame in substantial alignment with said first opening and said second opening such that said original is held in between said lower holder frame and said upper holder frame; and
- said lower holder frame having a thickness which maintains said original at a distance away from the image reading drum sufficient to avoid Newton rings in the signal; and
- wherein said lower holder frame and said upper holder frame form a disk-shaped holder; and
- said device further comprises a supporting sheet with a circular opening, which said disk-shaped holder fits, for rotatably supporting said disk-shaped holder;
- said disk-shaped holder having an indicator mark thereon, and said supporting sheet having indices such that the relation between said indicator and said indices shows an orientation of said disk-shaped holder.

* * * * *